No. 777,785. PATENTED DEC. 20, 1904.
J. J. HICKEY & M. C. WICKENS.
COUPLING SHANK.
APPLICATION FILED MAY 5, 1904.
NO MODEL.

Witnesses
C. E. Hunt.
L. Hilton.

Inventors
J. J. Hickey.
M. C. Wickens.

By H. B. Willson
Attorney

No. 777,785.

Patented December 20, 1904.

UNITED STATES PATENT OFFICE.

JAMES JOSEPH HICKEY AND MARTIN CHARLES WICKENS, OF ANDERSON, INDIANA; SAID HICKEY ASSIGNOR TO SAID WICKENS.

COUPLING-SHANK.

SPECIFICATION forming part of Letters Patent No. 777,785, dated December 20, 1904.

Application filed May 5, 1904. Serial No. 206,565.

*To all whom it may concern:*

Be it known that we, JAMES JOSEPH HICKEY and MARTIN CHARLES WICKENS, citizens of the United States, residing at Anderson, in the county of Madison and State of Indiana, have invented certain new and useful Improvements in Coupler-Shanks; and we do declare the following to be a full, clear, and exact description of the invention, such as will enable others skilled in the art to which it appertains to make and use the same.

This invention relates to improvements in coupler-shanks.

The object of the invention is to provide a coupler-shank formed in two parts whereby should a coupler-head become broken the fore part of the shank carrying said head may be quickly removed and replaced without disturbing the rear part of the same or the draft-rigging.

A further object is to provide a coupler-shank of this character which will be simple in construction, strong, durable, and which may be quickly coupled to any form of standard draft-rigging.

With these and other objects in view the invention consists of certain novel features of construction, combination, and arrangement of parts, as will be more fully described, and particularly pointed out in the appended claims.

In the accompanying drawings, Figure 1 is a side view of a coupler-stem constructed in accordance with the invention. Fig. 2 is a similar view showing the parts of the same separated, and Fig. 3 is a longitudinal sectional view of the same.

Referring more particularly to the drawings, 1 denotes the coupler-shank, which is preferably rectangular in cross-section, and consists of a forward section 2, having formed on one end thereof a coupler-head 3, which may be of any suitable construction. The opposite or inner end of said forward section 2 of the shank is reduced to form a tongue 4, which is preferably square in cross-section, and tapers toward its free end and is adapted to enter a square tapering socket 5, formed in the outer end of the rear section 6 of the coupler-shank. In the side walls of said rear section 6 of the shank are formed alined oblong slots 7, and in the tongue 4 of the forward section of the shank is formed a slot 8, which when said parts are assembled coincides or registers with the slots 7, and through said alined slots is disposed a flat bar 9, forming a key, whereby said parts are locked together. In the rear section 6 and forming a continuation of the socket 5 is a cavity 10, which is adapted to receive the head of a coupler-stem. (Not shown.) In the end of the shank-section 6 is formed a passage 12, which communicates with the cavity 10, and through this passage said coupler-stem is adapted to pass.

In the sides of the rear section 6, near the inner ends of the same, are formed holes 13 for the passage of yoke-rivets, (not shown,) by which said shank may be connected to the draft-rigging. The inner end of the tongue 4 of the forward section of the shank is recessed, as at 14, to permit the same to enter the socket 5 of the shank-section.

Any suitable form of draft-rigging may be employed in connection with this coupler-shank, whereby the same may be attached to a car.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

1. A coupler-shank, consisting of an outer head-section having formed on its inner end a reduced, tapering tongue, an inner section having in its outer end a tapering socket adapted to receive said tongue, and means whereby said parts are detachably locked together, substantially as described.

2. A coupler-shank, consisting of an outer head-section having formed on its outer end a coupler-head, a reduced inwardly-tapering tongue formed on its inner end, said tongue being provided with a slot, an inner section having formed in its outer end a tapering socket to receive said tongue, and having alined slots formed in its sides, a locking bar or key adapted to be inserted through the slots in said socket-section and said tongue, and means whereby said inner socket-section may be connected to the draft-rigging of a car, substantially as described.

3. A coupler-shank, consisting of an outer head-section, having formed on its inner end a square, inwardly-tapering tongue, an inner section having in its outer end a square, tapering socket adapted to receive said tongue, means for detachably locking said parts together, means whereby said shank may be attached to a draft-yoke and means whereby a coupler-stem may be connected to the inner section of said shank, substantially as described.

In testimony whereof we have hereunto set our hands in presence of two subscribing witnesses.

JAMES JOSEPH HICKEY.
MARTIN CHARLES WICKENS.

Witnesses:
C. O'CROWLEY,
WM. ROWLAND.